United States Patent
Kim et al.

(10) Patent No.: US 11,861,230 B2
(45) Date of Patent: Jan. 2, 2024

(54) CONTROLLER AND OPERATING METHOD THEREOF CAPABLE OF REDUCING POWER CONSUMPTION WHILE SATISFYING REQUIRED PERFORMANCE

(71) Applicant: SK hynix Inc., Gyeonggi-do (KR)

(72) Inventors: Kyeong Seok Kim, Gyeonggi-do (KR); Jin Soo Kim, Gyeonggi-do (KR); Su Ik Park, Gyeonggi-do (KR); Yong Joon Joo, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 66 days.

(21) Appl. No.: 17/562,753

(22) Filed: Dec. 27, 2021

(65) Prior Publication Data
US 2022/0334769 A1   Oct. 20, 2022

(30) Foreign Application Priority Data

Apr. 15, 2021   (KR) .......................... 10-2021-0049242

(51) Int. Cl.
*G06F 3/06* (2006.01)
*G06F 1/08* (2006.01)
*G06F 13/28* (2006.01)

(52) U.S. Cl.
CPC .............. *G06F 3/0659* (2013.01); *G06F 1/08* (2013.01); *G06F 3/0604* (2013.01); *G06F 3/0673* (2013.01); *G06F 13/28* (2013.01)

(58) Field of Classification Search
CPC .................................. G06F 3/0659; G06F 1/08
See application file for complete search history.

(56) References Cited

U.S. PATENT DOCUMENTS

| | | | | |
|---|---|---|---|---|
| 2007/0192650 A1* | 8/2007 | Shiota | ............... | G06F 1/3203 |
| | | | | 713/600 |
| 2016/0216899 A1* | 7/2016 | Park | ............... | G06F 3/0655 |
| 2018/0074743 A1* | 3/2018 | Jeter | ............... | G06F 3/0653 |
| 2022/0083115 A1* | 3/2022 | Kwon | ............... | G06F 1/3228 |

FOREIGN PATENT DOCUMENTS

KR   10-2017-0110448 A   10/2017

* cited by examiner

*Primary Examiner* — David E Martinez
(74) *Attorney, Agent, or Firm* — IP & T GROUP LLP

(57) ABSTRACT

An operating method of a controller that controls a memory device includes initializing a clock frequency set corresponding to clock signals provided to a plurality of operation modules included in the controller when a change in a current performance or a change in a host request pattern is detected, determining a target performance on the basis of the current performance given after the clock frequency set is initialized, determining an optimal clock frequency set, in which the current performance is able to be maintained equal to or greater than the target performance, by repeatedly performing an operation of changing at least one clock frequency included in the clock frequency set and an operation of monitoring the current performance given after the clock frequency is changed, and providing the plurality of operation modules with clock signals according to the optimal clock frequency set.

18 Claims, 5 Drawing Sheets

FIG. 4

| Module<br>Clock level | Host I/F<br>(132) | Processor<br>(134) | Memory I/F<br>(142) | Memory<br>(144) |
|---|---|---|---|---|
| Level 10<br>(default) | 1000MHz | 800MHz | 900MHz | 1000MHz |
| Level 9 | 950MHz | 780MHz | 880MHz | 970MHz |
| Level 8 | 920MHz | 750MHz | 820MHz | 920MHz |
| Level 7 | 900MHz | 730MHz | 820MHz | 920MHz |
| Level 6 | 880MHz | 700MHz | 800MHz | 900MHz |
| ... | ... | ... | ... | ... |

CONTROLLER AND OPERATING METHOD THEREOF CAPABLE OF REDUCING POWER CONSUMPTION WHILE SATISFYING REQUIRED PERFORMANCE

CROSS-REFERENCE TO RELATED APPLICATION(S)

The present application claims priority under 35 U.S.C. § 119(a) to Korean Patent Application No. 10-2021-0049242, filed on Apr. 15, 2021, the disclosure of which is incorporated herein by reference in its entirety.

BACKGROUND

1. Field

Various embodiments of the present disclosure generally relate to a controller and an operating method thereof.

2. Description of the Related Art

The computer environment paradigm has been transitioning to ubiquitous computing, which enables computing systems to be used anytime and anywhere. As a result, use of portable electronic devices such as mobile phones, digital cameras, and laptop computers has rapidly increased. These portable electronic devices generally use a memory system having one or more memory devices for storing data. A memory system may be used as a main memory device or an auxiliary memory device of a portable electronic device.

Since memory systems have no moving parts, memory systems provide advantages such as excellent stability and durability, high information access speed, and low power consumption. Examples of memory systems having such advantages include universal serial bus (USB) memory devices, memory cards having various interfaces, and solid state drives (SSDs).

SUMMARY

Various embodiments of the present disclosure are directed to a controller capable of reducing power consumption while satisfying a required performance, and an operating method of the controller.

In accordance with an embodiment of the present disclosure, an operating method of a controller that controls a memory device may include: initializing a clock frequency set corresponding to clock signals provided to a plurality of operation modules included in the controller when a change in a current performance or a change in a host request pattern is detected; determining a target performance on the basis of the current performance given after the clock frequency set is initialized; determining an optimal clock frequency set in which the current performance is able to be maintained equal to or greater than the target performance, by repeatedly performing an operation of changing at least one clock frequency included in the clock frequency set and an operation of monitoring the current performance given after the clock frequency is changed; and providing the plurality of operation modules with clock signals according to the optimal clock frequency set.

The optimal clock frequency set may be a clock frequency set in which power consumption is minimized, among clock frequency sets in which the current performance is able to be maintained equal to or greater than the target performance.

The initializing of the clock frequency set may include determining, as a predetermined maximum value, each of the clock frequencies included in the clock frequency set.

The operating method may further include initializing the clock frequency set when a change in a command queue state is detected, and the command queue state may include the number of command queue pairs that queue a command received from a host and a queue depth for each queue pair.

The determining of the optimal clock frequency set may include: terminating repetition of the operation of changing the clock frequency and the operation of monitoring the current performance when it is detected that the current performance becomes lower than the target performance; and determining, as the optimal clock frequency set, a clock frequency set determined in a repeating operation immediately before a last repeating operation.

The operation of changing the clock frequency may include an operation of lowering respective levels of one or more clock frequencies included in the clock frequency set by one or more levels with reference to a clock level table being accessible by the controller.

The operation of monitoring the current performance may include: monitoring an amount of data exchanged between the controller and a host per unit time; and determining the current performance on the basis of the amount of data monitored per unit time.

The monitoring of the amount of data may include counting the number of data blocks transmitted and received through direct memory access (DMA) per unit time.

The host request pattern may include the type and pattern of a command received from a host, the type of the command may include a read type and a write type, and the pattern of the command may include a sequential pattern and a random pattern.

Each of the plurality of operation modules may include a processor, a host interface, a memory interface and a memory.

In accordance with an embodiment of the present disclosure, a controller that controls a memory device may include: a plurality of operation modules each including a processor and a memory; and a clock generator suitable for providing the plurality of operation modules with clock signals, and when the processor detects a change in a current performance or a change in a host request pattern, the processor may initialize a clock frequency set corresponding to the clock signals provided to the plurality of operation modules, determine a target performance on the basis of the current performance given after the clock frequency set is initialized, determine an optimal clock frequency set in which the current performance is able to be maintained equal to or greater than the target performance, and provide the plurality of operation modules with clock signals according to the optimal clock frequency set, and the processor may determine the optimal clock frequency set by repeatedly performing an operation of changing at least one clock frequency included in the clock frequency set and an operation of monitoring the current performance given after the clock frequency is changed.

The optimal clock frequency set may be a clock frequency set in which power consumption is minimized, among clock frequency sets in which the current performance is able to be maintained equal to or greater than the target performance.

The processor may initialize the clock frequency set by determining, as a predetermined maximum value, each of clock frequencies included in the clock frequency set.

The processor may initialize the clock frequency set when detecting a change in a command queue state, and the command queue state may include the number of command queue pairs that queue a command received from a host and a queue depth for each queue pair.

The processor may terminate repetition of the operation of changing the clock frequency and the operation of monitoring the current performance when it is detected that the current performance becomes lower than the target performance, and determine, as the optimal clock frequency set, a clock frequency set determined in a repeating operation immediately before a last repeating operation.

The processor may perform an operation of lowering respective levels of one or more clock frequencies included in the clock frequency set by one or more levels with reference to a clock level table stored in the memory.

Each of the plurality of operation modules may further include a host interface, and the host interface may monitor an amount of data exchanged between the controller and a host per unit time, and determine the current performance on the basis of the amount of data monitored per unit time.

The host interface may monitor the amount of data by counting the number of data blocks transmitted and received through direct memory access (DMA) per unit time.

The host request pattern may include the type and pattern of a command received from a host, the type of the command may include a read type and a write type, and the pattern of the command may include a sequential pattern and a random pattern.

Each of the plurality of operation modules may further include a host interface and a memory interface.

BRIEF DESCRIPTION OF THE DRAWINGS

FIG. 4 is a diagram illustrating a clock level table in accordance with an embodiment of the present disclosure.

DETAILED DESCRIPTION

Hereinafter, various embodiments of the present disclosure will be described below in detail with reference to the accompanying drawings. In the following description, it is to be noted that only parts necessary for understanding the operation according to the present disclosure will be described, and the description of the other parts will be omitted so as not to obscure the subject matter of the present disclosure.

Figure 1:
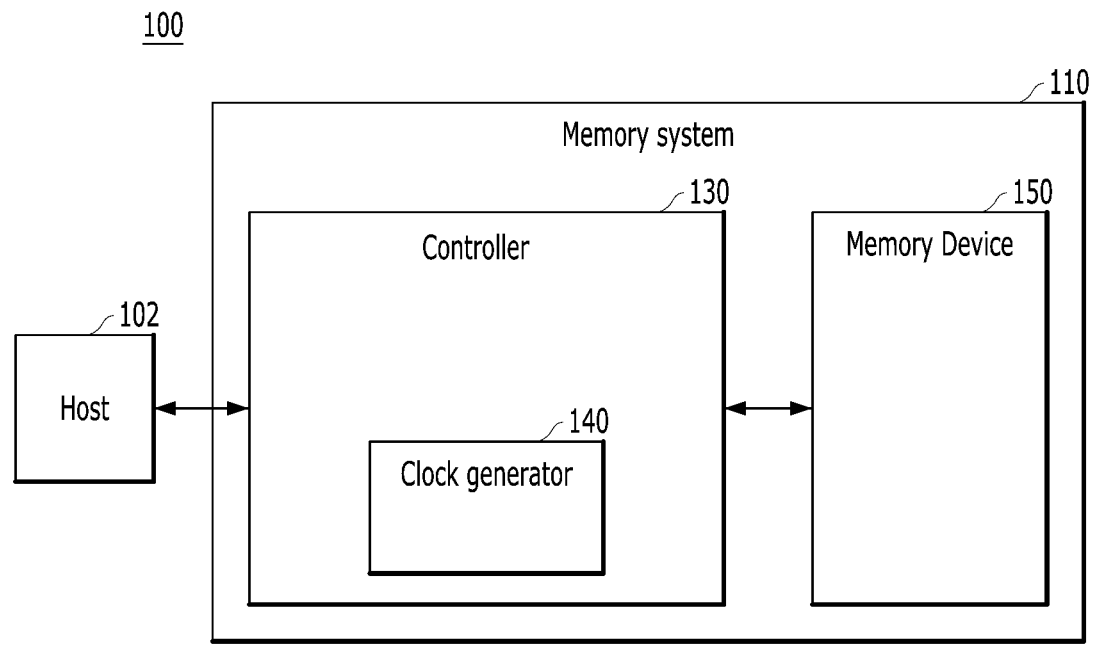
FIG. 1 is a diagram schematically illustrating an example of a data processing system including a memory system in accordance with an embodiment of the present disclosure.

FIG. 1 is a diagram schematically illustrating an example of a data processing system 100 including a memory system 110 in accordance with an embodiment of the present disclosure.

Referring to FIG. 1, the data processing system 100 may include a host 102 operatively coupled to a memory system 110.

The host 102 may include any of various portable electronic devices such as a mobile phone, MP3 player and laptop computer, or any of various non-portable electronic devices such as a desktop computer, a game machine, a television (TV), and a projector.

The host 102 may include at least one operating system (OS), which may manage and control overall functions and operations of the host 102, and provide one or more operations between the host 102 and a user using the data processing system 100 or the memory system 110. The OS may support functions and operations corresponding to the use, purpose, and usage of a user. For example, the OS may be divided into a general OS and a mobile OS, depending on the mobility of the host 102. The general OS may be divided into a personal OS and an enterprise OS, depending on the environment of a user.

The memory system 110 may operate to store data for the host 102 in response to a request of the host 102. Non-limiting examples of the memory system 110 may include a solid state drive (SSD), a multi-media card (MMC), a secure digital (SD) card, a universal serial bus (USB) device, a universal flash storage (UFS) device, a compact flash (CF) card, a smart media card (SMC), a personal computer memory card international association (PCMCIA) card and a memory stick. The MMC may include an embedded MMC (eMMC), reduced size MMC (RS-MMC) and micro-MMC, and the like. The SD card may include a mini-SD card and a micro-SD card.

The memory system 110 may be embodied by various types of storage devices. Examples of such storage devices may include, but are not limited to, volatile memory devices such as a dynamic random access memory (DRAM) and a static RAM (SRAM), and nonvolatile memory devices such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), a resistive RAM (RRAM or ReRAM) and a flash memory. The flash memory may have a 3-dimensional (3D) stack structure.

The memory system 110 may include a controller 130 and a memory device 150. The memory device 150 may store data for the host 102, and the controller 130 may control data storage into the memory device 150.

The controller 130 and the memory device 150 may be integrated into a single semiconductor device. For example, the controller 130 and the memory device 150 may be integrated as one semiconductor device to constitute a solid state drive (SSD). When the memory system 110 is used as an SSD, the operating speed of the host 102 connected to the memory system 110 can be improved. In addition, the controller 130 and the memory device 150 may be integrated as one semiconductor device to constitute a memory card. For example, the controller 130 and the memory device 150 may constitute a memory card such as a personal computer memory card international association (PCMCIA) card, a compact flash (CF) card, a smart media (SM) card, a memory stick, a multimedia card (MMC) including reduced size MMC (RS-MMC) and micro-MMC, a secure digital (SD) card including mini-SD card, micro-SD card and SDHC card, or a universal flash storage (UFS) device.

Non-limiting application examples of the memory system 110 may include a computer, an Ultra Mobile PC (UMPC), a workstation, a net-book, a Personal Digital Assistant (PDA), a portable computer, a web tablet, a tablet computer, a wireless phone, a mobile phone, a smart phone, an e-book, a Portable Multimedia Player (PMP), a portable game machine, a navigation system, a black box, a digital camera, a Digital Multimedia Broadcasting (DMB) player, a 3-dimensional television, a smart television, a digital audio recorder, a digital audio player, a digital picture recorder, a digital picture player, a digital video recorder, a digital video player, a storage device constituting a data center, a device capable of transmitting/receiving information in a wireless environment, one of various electronic devices constituting a home network, one of various electronic devices constituting a computer network, one of various electronic devices constituting a telematics network, a Radio Frequency Identification (RFID) device, or one of various components constituting a computing system.

The memory device 150 may be a nonvolatile memory device and may retain data stored therein even though power is not supplied. The memory device 150 may store data provided from the host 102 through a program operation, and provide data stored therein to the host 102 through a read operation. The memory device 150 may include a plurality of memory blocks, each of which may include a plurality of pages, and each of the pages may include a plurality of memory cells coupled to a word line. In an embodiment, the memory device 150 may be a flash memory. The flash memory may have a 3-dimensional (3D) stack structure.

The memory device 150 may include a plurality of memory blocks including a single level cell (SLC) memory block for storing 1-bit data and a multi-level cell (MLC) memory block for storing multi-bit data. The SLC memory block may include a plurality of pages implemented as memory cells each storing one bit data therein. The SLC memory block may have high durability and fast data operation performance. On the other hand, the MLC memory block may include a plurality of pages implemented as memory cells each storing multi-bit data, such as two or more bits, therein. The MLC memory block may have a larger data storage space than the SLC memory block. That is, the MLC memory block may be highly integrated.

The controller 130 may control the memory device 150 in response to a request of the host 102. For example, the controller 130 may provide the host 102 with data read from the memory device 150, and store data provided from the host 102 in the memory device 150. For this operation, the controller 130 may control read, program and erase operations of the memory device 150.

The controller 130 may include a plurality of operation modules for controlling the memory device 150. The plurality of operation modules may include a plurality of processing cores and a memory.

The controller 130 may include a clock generator 140 for providing each of the plurality of operation modules with one or more clock signals. The plurality of operation modules may operate based on the clock signals provided from the clock generator 140.

The memory system 110 may be required to operate with a performance equal to or greater than a predetermined required performance, according to a host request pattern. The host request pattern may indicate a command type and a command pattern of each of the commands provided from the host 102 to the memory system 110. For example, the command type may include a read type and a write type, and depending on implementation, the write type may include an SLC write type and an MLC write type. The command pattern may include a sequential pattern and a random pattern. The host request pattern may include an SLC sequential write pattern, an MLC sequential write pattern, an SLC random write pattern, an MLC random write pattern, a sequential read pattern, a random read pattern and a mixed pattern. The mixed pattern may indicate a workload pattern in which commands having different command types or command patterns are mixed and received from the host 102.

The required performance may indicate a performance required to be provided by the memory system 110 to a user. The required performance may be predetermined in a specification of the memory system 110 or the like.

The required performance may vary depending on the host request pattern. For example, the specification of the memory system 110 may require the memory system 110 to satisfy different required performance such that a required performance for a sequential read pattern is different from a required performance for a random read pattern.

Maximum clock frequency values of clock signals provided to each of the operation modules of the controller 130 may be predetermined. The maximum clock frequency values may be determined as frequency values that allow the memory system 110 to satisfy the required performance in all the host request patterns. When all of the operation modules operate according to a clock signal having the maximum frequency value, the required performance of the memory system 110 may be satisfied regardless of a current host request pattern. However, in this situation, power consumption and heat generation of the controller 130 may be maximized.

Depending on a workload for each operation module, even though at least some of the operation modules operate according to a clock signal having a frequency value lower than the maximum frequency value, the required performance of the memory system 110 may be satisfied. The workload may include a foreground workload required to process commands received from the host 102 and a background workload required to manage the memory system 110.

The foreground workload for each operation module may vary according to the host request pattern that changes in real time. The background workload for each operation module may also vary in real time. Accordingly, an optimal clock frequency, which is a clock frequency capable of minimizing power consumption while satisfying the required performance of the memory system 110, may vary in real time for each operation module. The controller 130 according to an embodiment may adaptively determine the optimal clock frequency for each operation module, on the basis of changes in the host request pattern and background workload.

According to an embodiment, the controller 130 may determine a target performance of the memory system 110, and determine an optimal clock frequency set on the basis of the target performance. In addition, the controller 130 may change the target performance and the optimal clock frequency set when detecting a change in the host request pattern or a change in the background workload. The target performance may indicate the performance of the memory system 110 when operation modules of the controller 130 operate according to the clock signal having the maximum frequency value. A clock frequency set may refer to a set of frequencies of the clock signals provided to the plurality of operation modules. The optimal clock frequency set may refer to a set of clock frequencies in which a current performance (or actual performance) of the memory system 110 may satisfy the target performance and power consumption may be minimized. The term "current performance" herein and below represents actual performance of the memory system 110 (i.e., the controller 130 and the memory device 150).

The controller 130 may detect a change in the background workload by detecting a change in the current performance. For example, when the current performance decreases even though the clock frequency set corresponding to the clock signals provided to the operation modules and the host request pattern do not change, the controller 130 may detect that the background workload increases.

The controller 130 may initialize the clock frequency set when detecting the changes in the host request pattern and current performance. For example, the controller 130 may initialize the clock frequency set by determining the clock frequency set as the maximum clock frequencies determined for the operation modules. The controller 130 may determine the current performance given after the clock frequency set is initialized, and determine the current performance as the target performance.

The controller 130 may repeatedly perform an operation of changing at least one clock frequency included in the clock frequency set and an operation of monitoring the current performance given after the clock frequency is changed. For example, the controller 130 may repeatedly perform the operation of changing the clock frequency and the operation of monitoring the current performance until the monitored current performance becomes lower than the target performance.

The controller 130 may determine, as the optimal clock frequency set, a clock frequency set of a repeating operation immediately before a last repeating operation in which the current performance becomes lower than the target performance. The controller 130 may control the clock generator 140 to provide the plurality of operation modules with the clock signals according to the determined optimal clock frequency set. According to an embodiment, the controller 130 may minimize power consumption and heat generation of the memory system 110 while satisfying the required performance of the memory system 110.

Figure 2:
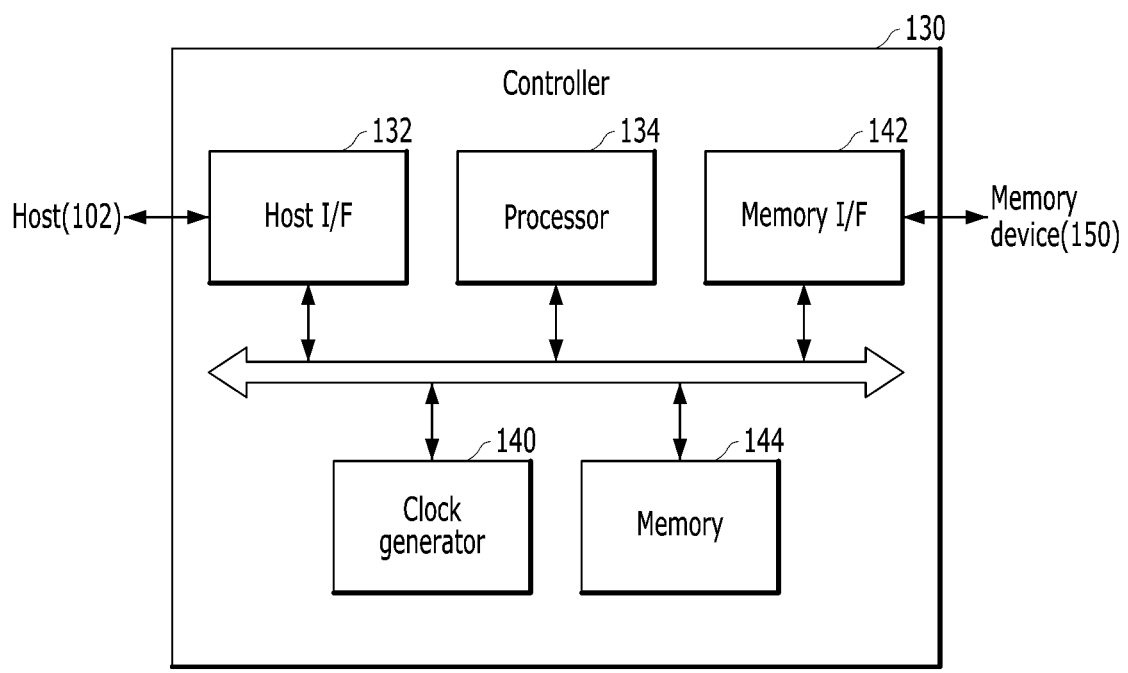
FIGS. 2 and 3 are diagrams illustrating a controller in accordance with an embodiment of the present disclosure.

FIG. 2 is a diagram specifically illustrating the controller 130 described above with reference to FIG. 1 in accordance with an embodiment of the present disclosure.

Referring to FIG. 2, the controller 130 may include a host interface (I/F) 132, a processor 134, a clock generator 140, a memory interface 142 and a memory 144, all operatively coupled via an internal bus. The clock generator 140 may correspond to that described with reference to FIG. 1. The host interface 132, the processor 134, the memory interface 142 and the memory 144 may correspond to the plurality of operation modules described with reference to FIG. 1.

The host interface 132, which is a region for exchanging data with the host 102, may drive firmware referred to as a host interface layer (HIL).

Depending on implementation, the host interface 132 may be a command queue interface that supports a protocol such as Non-Volatile Memory express (NVMe). The command queue interface may support interfacing between the host 102 and the memory system 110 on the basis of a queue pair including a submission queue for inputting a requested command and a completion queue for recording a processing result of a corresponding command. The queue pair may be included in the host interface 132. The host 102 may determine the number of queue pairs and a queue depth for each queue pair. The queue depth may refer to the number of commands that can be simultaneously queued in each queue.

The required performance of the memory system 110 may vary according to information on the number of queue pairs and information on the queue depth for each queue pair. For example, the host 102 may increase the number of commands that can be simultaneously queued in the memory system 110 by increasing the number of queue pairs and the queue depth for each queue pair. As the number of commands that can be simultaneously queued in the memory system 110 increases, the memory system 110 may process commands with higher performance, and a higher required performance may be specified.

According to the present embodiment, when the controller 130 detects a change in a command queue state as well as a change in the current performance of the memory system 110 or a change in the host request pattern, the controller 130 may initialize the clock frequency set, and then change the optimal clock frequency set. The command queue state may indicate the number of queue pairs and the queue depth for each queue pair. The controller 130 may flexibly respond to the required performance changed by the host 102 by changing the optimal clock frequency set on the basis of the change in the command queue state.

The host interface 132 may include a direct memory access (DMA) that controls data transmission/reception between the host 102 and the memory 144. Depending on implementation, the host interface 132 may monitor the current performance of the memory system 110 by monitoring the amount of data transmitted and received through the DMA.

The memory interface 142 may serve as a memory/storage interface for interfacing the controller 130 and the memory device 150 such that the controller 130 controls the memory device 150 in response to a request from the host 102. When the memory device 150 is a flash memory or specifically a NAND flash memory, the memory interface 142 may generate a control signal for the memory device 150 and process data to be provided to the memory device 150 under the control of the processor 134. The memory interface 142 may work as an interface (e.g., a NAND flash interface) for processing a command and data between the controller 130 and the memory device 150. Specifically, the memory interface 142 may support data transfer between the controller 130 and the memory device 150.

The memory interface 142 may drive firmware referred to as a flash interface layer (FIL).

The memory interface 142 may include an error correction code (ECC) component. The ECC component may detect and correct an error contained in the data read from the memory device 150. In other words, the ECC component may perform an error correction decoding process on the data read from the memory device 150 through an ECC value used during an ECC encoding process. According to a result of the error correction decoding process, the ECC component may output a signal, for example, an error correction success/fail signal. When the number of error bits is more than a threshold value of correctable error bits, the ECC component may not correct the error bits, and may output an error correction fail signal.

The ECC component may perform error correction through a coded modulation such as Low Density Parity Check (LDPC) code, Bose-Chaudhri-Hocquenghem (BCH) code, turbo code, Reed-Solomon code, convolution code, Recursive Systematic Code (RSC), Trellis-Coded Modulation (TCM) and Block coded modulation (BCM). However, the ECC component is not limited to any specific structure. The ECC component may include all circuits, modules, systems or devices for error correction.

The memory 144 may store clock frequency information referenced to determine the clock frequency set of the controller 130. The clock frequency information may include maximum clock frequencies determined for operation modules.

The processor 134 may control overall operation of the memory system 110. The processor 134 may drive firmware to control the overall operation of the memory system 110. The firmware may be referred to as a flash translation layer (FTL). In addition, the processor 134 may be implemented as a microprocessor or a central processing unit (CPU) including one or more processing cores.

The processor 134 may drive a flash translation layer (FTL) and perform a data input and output (IO) operation corresponding to a request received from the host 102. For example, the processor 134 may control a write operation of the memory device 150 in response to a write request from the host 102, and control a read operation of the memory device 150 in response to a read request from the host 102.

The controller 130 may perform various internal tasks for managing the memory device 150 through the processor 134. For example, the internal tasks may include a background task such as a garbage collection (GC) operation, a wear leveling (WL) operation, a map flush operation and a bad block management operation.

The processor 134 may determine the host request pattern on the basis of the command type and command pattern of one or more commands provided from the host 102. The processor 134 may determine the clock frequency set on the basis of current performance information from the host interface 132 and the host request pattern.

The clock generator 140 may provide the host interface 132, the processor 134, the memory interface 142 and the memory 144 with one or more clock signals on the basis of the clock frequency set determined by the processor 134.

A method of determining the clock frequency set by the processor 134 is described in detail with reference to FIG. 3.

Figure 3:
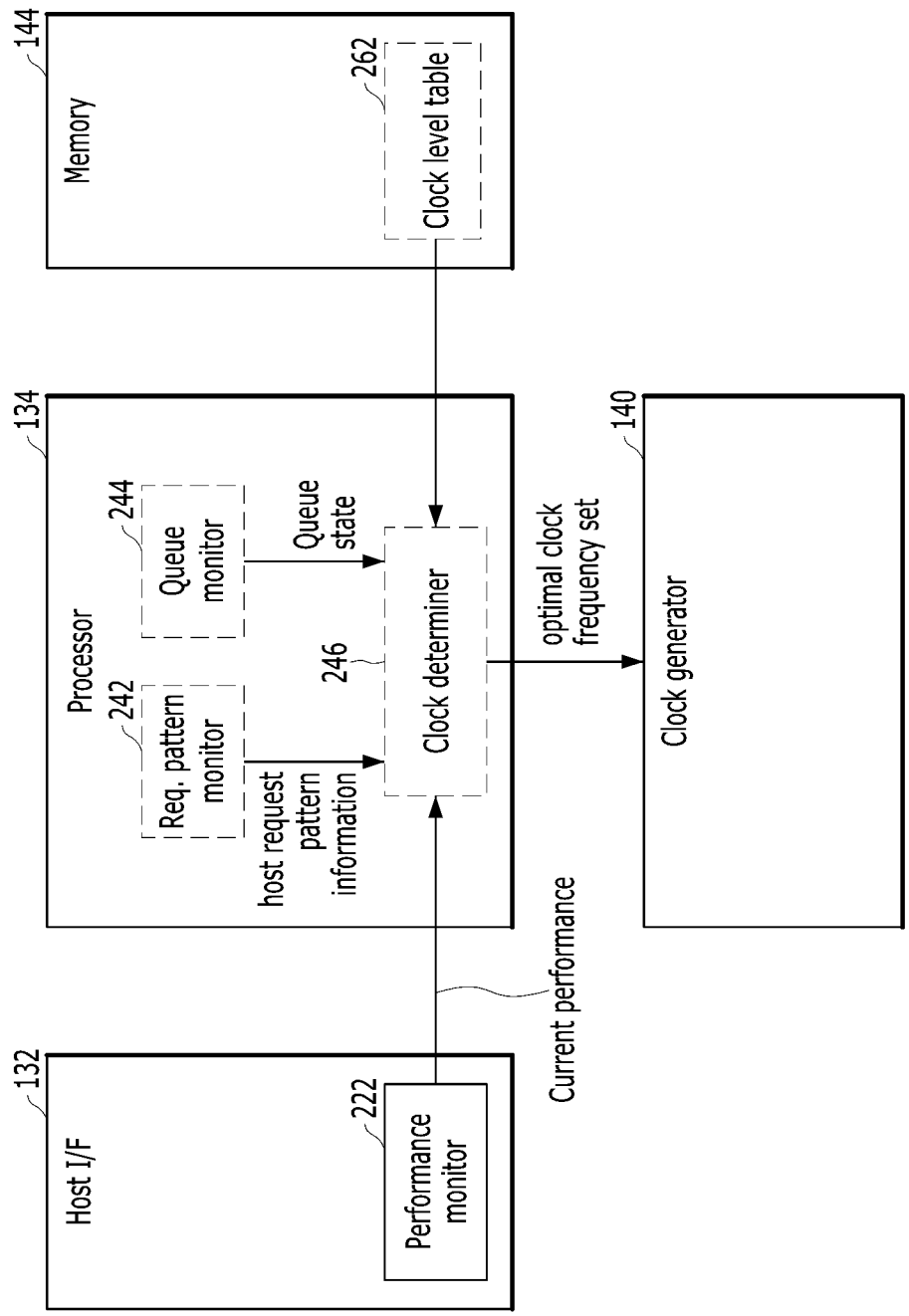

FIG. 3 is a diagram illustrating the controller 130 in accordance with an embodiment of the present disclosure.

The controller 130 of FIG. 3 may correspond to the controller 130 described with reference to FIG. 2. FIG. 3 illustrates some of components that may be included in the controller 130.

Referring to FIG. 3, the host interface 132 may include a performance monitor 222. The performance monitor 222 may monitor the current performance of the memory system 110 by monitoring the amount of data exchanged between the controller 130 and the host 102.

In a first example, the performance monitor 222 may monitor the current performance of the memory system 110 by counting the number of data blocks transmitted/received through the DMA per unit time. In a second example, the host interface 132 may receive command wrappers, each including information on a command from the host 102. The host interface 132 may monitor the current performance of the memory system 110 on the basis of information on sizes of data included in the command wrappers received per unit time.

The performance monitor 222 may be implemented as hardware on a controller chip, but the present disclosure is not limited thereto.

The processor 134 may include a request (Req.) pattern monitor 242, a queue monitor 244 and a clock determiner 246.

The request pattern monitor 242 may determine the host request pattern in real time by monitoring the command type and command pattern of one or more commands received from the host 102. Known methods may be used for the request pattern monitor 242 to determine the host request pattern.

The queue monitor 244 may monitor command queue state information including the information on the number of queue pairs and the information on the queue depth for each queue pair. The command queue state information may be obtained from the host interface 132.

The clock determiner 246 may change the clock frequency set on the basis of the current performance information from the performance monitor 222, the host request pattern information from the request pattern monitor 242 and the command queue state information from the queue monitor 244. The determining of the clock frequency set may refer to determining a clock frequency for each operation module of the controller 130.

The clock determiner 246 may determine the target performance by monitoring the current performance given when clock frequency values included in the clock frequency set are initialized to maximum values. The maximum clock frequency values may be determined as frequency values that allow the memory system 110 to satisfy the required performance in all of the host request patterns. Accordingly, the target performance may be equal to or greater than the required performance of the memory system 110 under a current host request pattern and command queue state.

The clock determiner 246 may determine an optimal clock frequency set capable of minimizing power consumption while satisfying the target performance. The clock determiner 246 may provide the clock generator 140 with the determined optimal clock frequency set. The clock generator 140 may provide each of the plurality of operation modules with a clock signal according to the clock frequency set.

The request pattern monitor 242 and the clock determiner 246 may be implemented as firmware loaded into the memory 144 and driven in the processor 134, but the present disclosure is not limited thereto.

The memory 144 may store a clock level table 262 as an example of the clock frequency data, which may be referenced by the clock determiner 246 to determine the clock frequency set. The clock level table 262 may include a plurality of clock frequency values, each of which may correspond to each of the operation modules. A clock level may be assigned to each of the plurality of clock frequency values. The clock determiner 246 may determine the clock frequency set of the operation modules by determining the clock level for each operation module with reference to the clock level table 262.

A method of determining the clock frequency set of the operation modules by the clock determiner 246 is described in detail with reference to FIGS. 4 and 5.

FIG. 4 is a diagram illustrating the clock level table 262 in accordance with an embodiment of the present disclosure.

The clock level table 262 may include clock frequency values according to a plurality of clock levels for each operation module. FIG. 4 illustrates the host interface 132, the processor 134, the memory interface 142 and the memory 144 as examples of the operation modules.

In an example of FIG. 4, the clock level table 262 may include 10 clock frequency values for each operation module, and the clock levels from level "1" to level "10" may be assigned to the clock frequency values, respectively. The clock frequency values corresponding to each of the clock levels may be determined in advance. The clock frequency value corresponding to level "10" of each operation module may correspond to a maximum clock frequency value.

The clock determiner 246 may determine to change the clock frequency set when the host request pattern, the command queue state or the current performance changes. The clock determiner 246 may initialize the clock levels of the operation modules included in a clock level set to level "10" which is a default level.

The clock determiner 246 may determine the target performance of the memory system 110 on the basis of the current performance given after the clock level set is initialized. The clock determiner 246 may change the clock level set by changing at least one clock level in the clock level set. Further, the clock determiner 246 may repeatedly perform an operation of determining whether the current performance is maintained greater than or equal to the target performance when the operation modules operate based on the changed clock level set. Thereby the clock level set can be determined such that power consumption can be reduced while maintaining the target performance.

Figure 5:
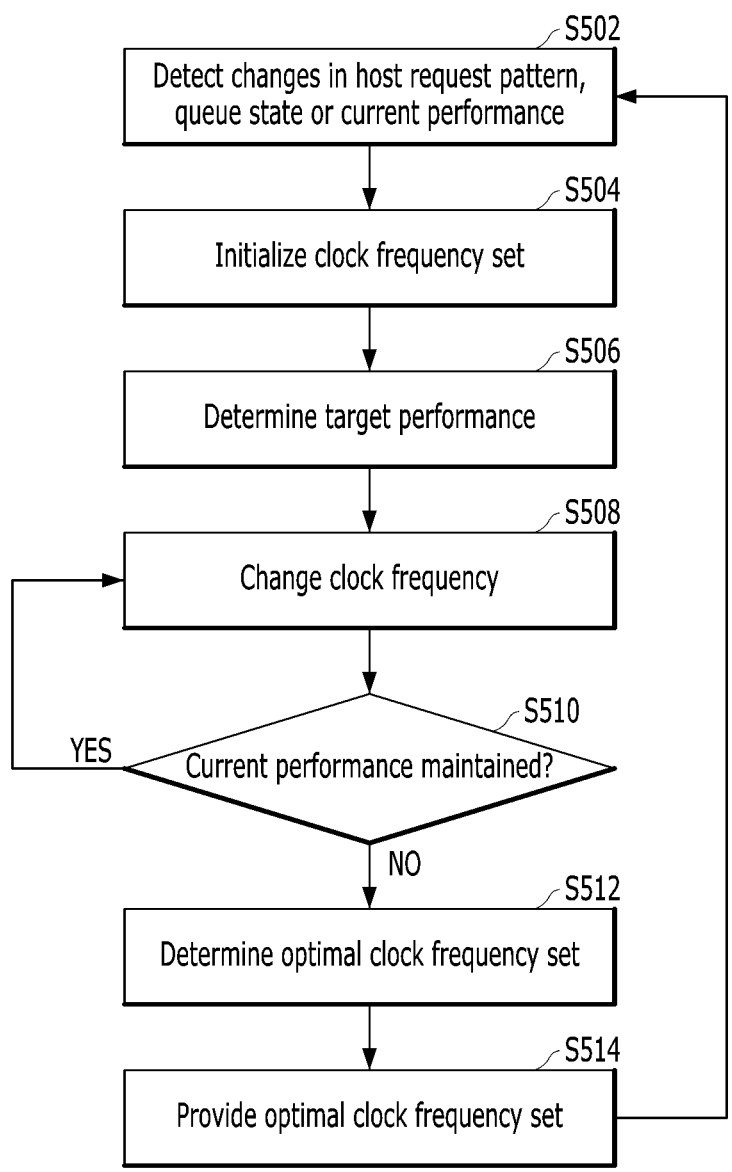
FIG. 5 is a flowchart illustrating an operation of the controller in accordance with an embodiment of the present disclosure.

FIG. 5 is a flowchart illustrating an operation of the controller 130 in accordance with an embodiment of the present disclosure.

Referring to FIG. 5, in operation S502, the clock determiner 246 may detect a change in a host request pattern, a change in a command queue state or a change in a current performance.

The clock determiner 246 may detect the changes in the host request pattern, the command queue state and/or the current performance on the basis of the host request pattern obtained from the request pattern monitor 242, the command queue state obtained from the queue monitor 244 and/or the current performance obtained from the performance monitor 222, respectively. When the clock determiner 246 detects the changes in the host request pattern, the command queue state or the current performance, the clock determiner 246 may determine to change a clock level set by performing operations S504, S506, S508, S510 and S512.

In a first example, the request pattern monitor 242 may determine the host request pattern on the basis of the type and pattern information of commands received from the host interface 132. For example, when the commands received from the host 102 are changed from SLC sequential write commands to MLC sequential write commands, the request pattern monitor 242 may change the host request pattern from SLC sequential write to MLC sequential write. When the host request pattern is changed from the SLC sequential write to the MLC sequential write, a required performance of the memory system 110 may decrease. When the controller 130 operates based on a current clock level set even though the required performance of the memory system 110 decreases, power consumption of the memory system 110 may be wasted. Accordingly, the clock determiner 246 may determine to change the clock level set when detecting that the host request pattern is changed.

In a second example, the queue monitor 244 may determine the command queue state on the basis of information on the number of queue pairs and information on a queue depth for each queue pair obtained from the host interface 132. For example, when the command queue depth increases, command queue state information may be changed. When the command queue depth increases, the required performance of the memory system 110 may increase. When the controller 130 operates based on the current clock level set even though the required performance of the memory system 110 increases, it may be difficult to satisfy the required performance of the memory system 110.

Accordingly, the clock determiner 246 may determine to change the clock level set when detecting that the command queue state is changed.

In a third example, the performance monitor 222 may determine the current performance of the memory system 110 on the basis of the amount of data transmitted and received from the host interface 132. For example, when a background workload of the controller 130 increases, resources for performing a foreground operation become insufficient, and thus the current performance may decrease. When the controller 130 operates based on the current clock level set even though the current performance decreases, it may be difficult to satisfy the required performance of the memory system 110. Accordingly, the clock determiner 246 may determine to change the clock level set when detecting that the current performance is changed.

In operation S504, the clock determiner 246 may initialize a clock frequency set to maximum clock frequencies.

According to an embodiment, the clock determiner 246 may initialize the clock frequency set by determining the clock level set as a default level set. In the example of FIG. 4, the clock determiner 246 may determine clock levels of the host interface 132, the processor 134, the memory interface 142 and the memory 144 as "10", thereby initializing clock frequencies to "1000 MHz", "800 MHz", "900 MHz" and "1000 MHz", respectively.

Hereinafter, the clock level set may be denoted as [a, b, c, d], and the clock frequency set may be denoted as [A, B, C, D]. "a", "b", "c" and "d" may indicate the clock levels of the host interface 132, the processor 134, the memory interface 142 and the memory 144, respectively. "A", "B", "C" and "D" may indicate the clock frequencies of the host interface 132, the processor 134, the memory interface 142 and the memory 144, respectively.

In operation S506, the clock determiner 246 may determine a target performance of the memory system 110.

The clock determiner 246 may obtain current performance information from the performance monitor 222 after initializing the clock frequency set to the maximum clock frequencies. The current performance given after the clock frequency set is initialized to the maximum clock frequencies may vary depending on the host request pattern, the command queue state and/or the background workload. However, the maximum clock frequencies of the operation modules may be designed to satisfy the required performance of the memory system 110 irrespective of the host request pattern. Accordingly, the current performance given after the clock frequency set is initialized may satisfy the required performance according to the current host request pattern and command queue state. The clock determiner 246 may determine, as the target performance, the current performance given after the clock frequency set is initialized, in order to determine an optimal clock frequency set that can satisfy the required performance.

In operation S508, the clock determiner 246 may change at least one clock frequency included in the clock frequency set.

In the illustrated example of FIG. 4, the clock determiner 246 may change the clock frequency set to [950 MHz, 780 MHz, 880 MHz, 970 MHz] by changing the clock level set [10, 10, 10, 10] to [9, 9, 9, 9]. In addition, the clock determiner 246 may provide the clock generator 140 with the changed clock frequency set, thereby controlling the host interface 132, the processor 134, the memory interface 142 and the memory 144 to operate based on the clock frequencies of "950 MHz", "780 MHz", "880 MHz" and "970 MHz", respectively.

In operation S510, the clock determiner 246 may determine whether the current performance is maintained greater than or equal to the target performance given after the clock frequencies are changed.

When the current performance is greater than or equal to the target performance (that is, "YES" in operation S510), the clock determiner 246 may repeat operations S508 and S510 once more.

When the current performance is lower than the target performance (that is, "NO" in operation S510), the clock determiner 246 may determine the optimal clock frequency set in which the current performance can be maintained as the target performance, in operation S512.

For example, the clock determiner 246 may determine, as the optimal clock frequency set, the clock frequency set determined in a repeating operation immediately before a last repeating operation of operations S508 and S510.

For example, the clock determiner 246 may sequentially lower the clock level for each operation module by one level while repeating operations S508 and S510. As illustrated in FIG. 4, the clock level set may be changed in the order of [10, 10, 10, 10]→[9, 9, 9, 9]→[8, 8, 8, 8],→[7, 7, 7, 7],→[6, 6, 6, 6]. When the current performance becomes lower than the target performance as a result of changing the clock level set to [7, 7, 7, 7] by the clock determiner 246, the clock determiner 246 may determine the optimal clock level set as [8, 8, 8, 8], which is the clock level set of a repeating operation immediately before a last repeating operation. Referring to the clock level table 262, the optimal clock frequency set may be determined as [920 MHz, 750 MHz, 820 MHz, 920 MHz].

In operation S514, the clock determiner 246 may provide the clock generator 140 with the optimal clock frequency set so that the clock generator 140 provides the operation modules with clock signals on the basis of the optimal clock frequency set. The clock generator 140 may provide the host interface 132, the processor 134, the memory interface 142 and the memory 144 with the clock signals on the basis of the optimal clock frequency set.

Even after the optimal clock frequency set is determined, the clock determiner 246 may obtain the host request pattern from the request pattern monitor 242 in real time, obtain the command queue state from the queue monitor 244, and obtain the current performance of the memory system 110 from the performance monitor 222. When any of the host request pattern, the command queue state and the current performance is changed, the clock determiner 246 may change the optimal clock frequency set by performing the operations of FIG. 5 again, starting from operation S502.

A method of changing the clock level set in order to find the optimal clock frequency set by the clock determiner 246 is not limited to an example of lowering the clock level for each operation module by one level. In a first example, the clock determiner 246 may lower the clock levels of some operation modules in one repeating operation of operations S508 and S510. In a second example, the clock determiner 246 may lower corresponding clock levels by two or more levels according to the host request pattern or the operation module.

According to the present embodiment, the controller 130 may reduce power consumption while satisfying the required performance of the memory system 110 despite the host request pattern, command queue state and/or current performance that are changed in real time. In a first example, when the host request pattern is changed from SLC sequential write to MLC sequential write, the clock determiner 246 may decrease the optimal clock frequency set, thereby satisfying the required performance and reducing the power consumption. In a second example, when the command queue depth increases, the clock determiner 246 may increase the optimal clock frequency set, thereby satisfying the increasing required performance. In a third example, when the background workload of the controller 130 increases, the clock determiner 246 may increase the optimal clock frequency set, thereby maintaining the required performance even while performing the background operation.

An example of the clock generator 140 that provides the operation modules with the clock signals in response to the control of the clock determiner 246 is described below with reference to FIG. 6.

Figure 6:
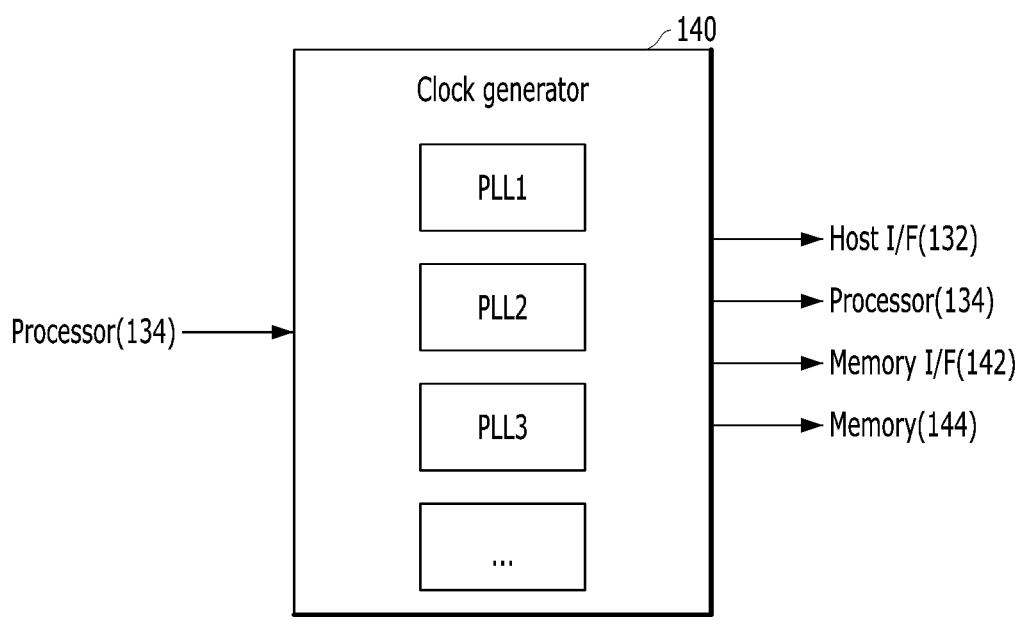
FIG. 6 is a diagram illustrating a clock generator in accordance with an embodiment of the present disclosure.

FIG. 6 is a diagram illustrating the clock generator 140 in accordance with an embodiment of the present disclosure.

Referring to FIG. 6, the clock generator 140 may include a plurality of phase-locked loops (PLLs). The plurality of phase-locked loops, e.g., 3 phase-locked loops PLL1, PLL2 and PLL3, may include oscillators having different clock frequencies and dividers for dividing the clock frequency.

The clock generator 140 may generate clock signals having various clock frequencies by setting division ratios of the plurality of phase-locked loops PLL1, PLL2 and PLL3.

The clock generator 140 may obtain a clock frequency set from an internal register of the clock determiner 246. Further, the clock generator 140 may generate clock signals to be provided to the host interface 132, the processor 134 and the memory interface 142 by using the plurality of phase-locked loops PLL1, PLL2 and PLL3. In addition, the clock generator 140 may provide the host interface 132, the processor 134 and the memory interface 142 with the generated clock signals.

According to an embodiment, when the controller 130 detects a change in actual performance of the memory system 110, a change in a host request pattern or a change in a command queue state, the controller 130 may determine an optimal clock frequency which can minimize power consumption while satisfying the required performance of the memory system 110.

The controller 130 may flexibly respond to changes in the current performance, the host request pattern and the command queue state by changing the optimal clock frequency set in response to the current performance, host request pattern and command queue state that are changed in real time, respectively.

For example, even when the host request pattern corresponds to a mixed pattern in which the required performance is not specified in the specification in advance, the controller 130 may determine a target performance, and determine the optimal clock frequency set on the basis of the target performance. In addition, the controller 130 may detect that the required performance is improved and change the target performance by changing the command queue state of the host 102, and may determine the optimal clock frequency set on the basis of the changed target performance. In addition, the controller 130 may detect that the background workload increases by detecting that the current performance is changed, and satisfy the required performance by changing the optimal clock frequency set. Accordingly, the controller 130 may minimize power consumption and heat generation while satisfying the required performance of the memory system 110 in real time.

According to the embodiments of the present disclosure, it is possible to provide a controller and an operating method thereof capable of reducing power consumption while satisfying a required performance.

Although a controller and an operating method thereof have been described with reference to the specific embodiments, these are merely examples, and the present disclosure is not limited thereto, and should be interpreted to have the widest scope according to the basic idea disclosed in the present specification. Those skilled in the art may carry out unspecified embodiments by combining and substituting the disclosed embodiments, which also do not depart from the scope of the present disclosure. In addition, those skilled in the art may easily change or modify the embodiments disclosed based on the present specification, and it is apparent that such changes or modifications also fall within the scope of the present disclosure and the following claims. Furthermore, the embodiments may be combined to form additional embodiments.

What is claimed is:

1. An operating method of a controller that controls a memory device, comprising:
   initializing a clock frequency set corresponding to clock signals provided to a plurality of operation modules included in the controller when a change in actual performance of the controller and the memory device or a change in a host request pattern is detected;
   determining target performance on the basis of the actual performance after the clock frequency set is initialized;
   determining an optimal clock frequency set such that the actual performance is maintained greater than or equal to the target performance, by repeatedly performing an operation of changing at least one clock frequency included in the clock frequency set and an operation of monitoring the actual performance after the clock frequency is changed; and
   providing the plurality of operation modules with clock signals according to the optimal clock frequency set,
   wherein the optimal clock frequency set is a clock frequency set such that power consumption of the controller and the memory device is minimized, among clock frequency sets such that the actual performance is maintained greater than or equal to the target performance.

2. The operating method of claim 1, wherein the initializing of the clock frequency set comprises determining, as a predetermined maximum value, each of clock frequencies included in the clock frequency set.

3. The operating method of claim 1, further comprising initializing the clock frequency set when a change in a command queue state is detected,
   wherein the command queue state includes the number of command queue pairs for queuing a command received from a host and a queue depth for each queue pair.

4. The operating method of claim 1, wherein the determining of the optimal clock frequency set comprises:
   terminating repetition of the operation of changing the clock frequency and the operation of monitoring the actual performance when it is detected that the actual performance becomes lower than the target performance; and
   determining, as the optimal clock frequency set, a clock frequency set determined in a repeating operation immediately before a last repeating operation.

5. The operating method of claim 1, wherein the operation of changing the clock frequency comprises an operation of lowering respective levels of one or more clock frequencies included in the clock frequency set by one or more levels with reference to a clock level table being accessible by the controller.

6. The operating method of claim 1, wherein the operation of monitoring the actual performance comprises:
   monitoring an amount of data exchanged between the controller and a host per unit time; and
   determining the actual performance on the basis of the amount of data.

7. The operating method of claim 6, wherein the monitoring of the amount of data comprises counting the number of data blocks transmitted and received through direct memory access (DMA) per unit time.

8. The operating method of claim 1, wherein the plurality of operation modules comprises a processor, a host interface, a memory interface and a memory.

9. A controller that controls a memory device, comprising:
   a plurality of operation modules including a processor and a memory; and
   a clock generator suitable for providing the plurality of operation modules with clock signals,
   wherein, when the processor detects a change in actual performance of the controller and the memory device or a change in a host request pattern, the processor initializes a clock frequency set corresponding to the clock signals provided to the plurality of operation modules, determines a target performance on the basis of the actual performance after the clock frequency set is initialized, determines an optimal clock frequency set such that the actual performance is maintained greater than or equal to the target performance, and provides the plurality of operation modules with clock signals according to the optimal clock frequency set,
   wherein the processor determines the optimal clock frequency set by repeatedly performing an operation of changing at least one clock frequency included in the clock frequency set and an operation of monitoring the actual performance after the clock frequency is changed, and
   wherein the optimal clock frequency set is a clock frequency set such that power consumption of the controller and the memory device is minimized, among clock frequency sets so that the actual performance is maintained greater than or equal to the target performance.

10. The controller of claim 9, wherein the processor initializes the clock frequency set by determining, as a predetermined maximum value, each of clock frequencies included in the clock frequency set.

11. The controller of claim 9, wherein the processor initializes the clock frequency set when detecting a change in a command queue state, and
    wherein the command queue state includes the number of command queue pairs for queuing a command received from a host and a queue depth for each queue pair.

12. The controller of claim 9, wherein the processor terminates repetition of the operation of changing the clock frequency and the operation of monitoring the actual performance when it is detected that the actual performance becomes lower than the target performance, and determines, as the optimal clock frequency set, a clock frequency set determined in a repeating operation immediately before a last repeating operation.

13. The controller of claim 9, wherein the processor performs an operation of lowering respective levels of one or more clock frequencies included in the clock frequency set by one or more levels with reference to a clock level table stored in the memory.

14. The controller of claim 9, wherein each of the plurality of operation modules further comprises a host interface, and the host interface monitors an amount of data exchanged between the controller and a host per unit time, and determines the actual performance on the basis of the amount of data.

15. The controller of claim 14, wherein the host interface monitors the amount of data by counting the number of data blocks transmitted and received through direct memory access (DMA) per unit time.

16. The controller of claim 9, wherein the host request pattern includes the type and pattern of a command received from a host, and
wherein the type of the command includes a read type and a write type, and the pattern of the command includes a sequential pattern and a random pattern.

17. The controller of claim 9, wherein the plurality of operation modules further comprises a host interface and a memory interface.

18. A memory system comprising:
a memory device; and
a controller coupled to the memory device and including a clock generator configured to generate at least one clock signal and at least one operation module configured to operate in response to the clock signal,
wherein the controller is configured to:
determine whether a change condition of a clock signal satisfies;
when it is determined that the change condition is satisfied, control the clock generator to provide a first clock signal with a first frequency to the operation module;
determine, as target performance, performance of the memory system when the first clock signal is provided to the operation module;
decrease the first frequency to determine a second frequency;
monitor, as actual performance, performance of the memory system when a second clock signal with the second frequency is provided to the operation module;
determine whether the actual performance is greater than or equal to the target performance;
when it is determined that the actual performance is less than the target performance, determine the second clock signal as an optimal clock signal; and
control the clock generator to provide the optimal clock signal to the operation module,
wherein an optimal clock frequency set corresponding to the optical clock signal is a clock frequency set such that power consumption of the controller and the memory device is minimized, among clock frequency sets so that the actual performance is maintained greater than or equal to the target performance.

* * * * *